United States Patent
Metsälä

[19]

[11] Patent Number: 5,862,707
[45] Date of Patent: Jan. 26, 1999

[54] FINE-MECHANICAL ADJUSTING DEVICE

[76] Inventor: Seppo Metsälä, Nauharinne 8, FIN-01260, Vantaa, Finland

[21] Appl. No.: 732,510
[22] PCT Filed: May 26, 1995
[86] PCT No.: PCT/FI95/00295
  § 371 Date: Nov. 13, 1996
  § 102(e) Date: Nov. 13, 1996
[87] PCT Pub. No.: WO95/32508
  PCT Pub. Date: Nov. 30, 1995

[30] Foreign Application Priority Data

May 25, 1995 [FI] Finland ................................. 942437

[51] Int. Cl.⁶ ............................. F16H 25/24; F16H 57/12
[52] U.S. Cl. ............................................. 74/441; 411/226
[58] Field of Search ...................... 74/441, 459; 411/222, 411/224, 225, 226

[56] References Cited

U.S. PATENT DOCUMENTS

| 1,742,722 | 1/1930 | Olsson et al. ............................. 411/222 |
| 2,734,394 | 2/1956 | Chauvel ...................................... 74/441 |
| 2,982,145 | 5/1961 | Orner ...................................... 74/441 X |
| 3,062,070 | 11/1962 | Beatty et al. ......................... 74/441 X |
| 4,864,884 | 9/1989 | Klinkenberg ...................... 411/226 X |

FOREIGN PATENT DOCUMENTS

| 324112 | 7/1989 | European Pat. Off. . | |
| 5160638 | 2/1955 | Italy ....................................... 411/225 |

Primary Examiner—Alan D. Herrmann
Attorney, Agent, or Firm—Andrus, Sceales, Starke & Sawall

[57] ABSTRACT

The present invention is directed to a fine-mechanical adjusting device, whose one embodiment includes a body (1) having internal threads and an end surface (8). An adjusting part (4) having external threads screws to the body (1). A clamping part (5) having internal threads screws to a part of the adjusting part (4) that extends beyond the body, and it has a seating surface (9) that faces the end surface (8). In order to eliminate the longitudinal backlash of the threads and to achieve easy, stable and accurate adjustment, an O-ring (7) is placed in a groove (10) in the end surface (8), which partly protrudes from the end surface (8). Correspondingly, the seating surface (9) contains seating parts (11) that are fitted so that when the clamping part (5) is screwed toward the body (1), the seating parts align with the O-ring (7), squeeze against it and change its shape so that the O-ring (7) keeps the clamping part (5) in place and aligned with the body (1) and exerts a thrusting force on the body and the clamping part in the direction of the axis (A) of the adjusting device.

15 Claims, 5 Drawing Sheets

FINE-MECHANICAL ADJUSTING DEVICE

BACKGROUND OF THE INVENTION

The present invention is directed to fine-mechanical adjusting devices and especially an adjusting device in which adjustment is performed by rotating an adjusting part with external threads inside a sleeve with internal threads. This type of adjusting device is commonly used in optical applications, for example, in which the position of a lens, an optical fiber or some other optical component must be precisely adjusted.

It is common knowledge that distance adjustment by means of threaded parts is problematic due to backlash in the threads, and that adjusting accuracies of one micrometer are obtainable with the most expensive manufacturing methods. However, in practical applications, it has proved to be very difficult to reach such accuracies at reasonable cost. Therefore, distance adjustment based on other technologies, such as thermal expansion or piezoelectric elements, often must be used to reach adjusting accuracies of one nanometer in, for example, optical applications requiring very accurate adjustment, such as laser measuring devices. Adjustment realized with a piezoelectric element, for example, requires an electronic unit connected to the element, raising the cost of the realization.

Therefore, it would be quite desirable if a simple, inexpensive solution for distance adjustment based on threaded parts were available, making it possible to obtain adjusting accuracies of 0.001 mm or even better, and offering backlash-free adjustment, sufficient adjusting sensitivity and good directional stability during adjustment. In many cases, said adjustment would replace a more complicated and costly adjustment, and said adjustment is also needed as a course adjustment in applications using even finer adjusting methods for final adjustment. The object of the present invention is to present said adjustment solution based on threaded parts.

SUMMARY OF THE INVENTION

The fine-mechanical adjusting device according to the present invention, which includes a first part having internal threads, a second part having external threads that screws into the first part and projects from the first part when the first and second parts are screwed together, a third part having internal threads that screws onto the part of the second part that projects from the first part, and a first seating surface of the first part and a second seating surface of the third part, which first and second seating surfaces face each other, is characterized in that a protruding elastic ring is fastened to the first seating surface or third seating surface, the general shape of the ring being a circle located around the axis of the adjusting device, on a plane perpendicular to the axis, with the center point of the circle on the axis, and correspondingly, the second seating surface or first seating surface contains seating parts, whose shape and size are formed so as to fit together with the part of the elastic ring that projects beyond the seating surface of the elastic ring, so that when the third part is screwed to bring it closer to the first part, the seating parts align with the elastic ring, squeezing it and changing its shape so that the elastic ring keeps the third part in place and aligned with the first part, and the ring exerts a force on the first and third parts in the direction of the axis of the adjusting device.

Two main applications of the adjusting device according to the present invention are presented in the following. In the first application, the first part is a body, the second part is an adjusting part that screws on the body and the third part is a clamping part that screws on the adjusting part toward the body. In the second application, the second part is the body, the first part is the adjusting part that screws on the body and the third part is the clamping part that screws on the body toward the adjusting part. In a preferred embodiment, the elastic ring is fastened to the seating surface of the first part, and the seating parts are located on the seating surface of the third part, or clamping part.

The elastic ring can be fastened to the second seating surface by several different means, and the ring may have different cross-sectional shapes, preferably shaped to facilitate alignment of the seating parts to the ring. The cross-sectional shape may also vary along the circumference of the ring. There also are several alternatives for realizing the seating parts. In the simplest embodiments, the seating parts may be formed by knurling or roughness, or bumps, pins or other protrusions on the seating surface, or grooves or holes in the smooth seating surface. The realization may also be a combination of the above. The realization may be or may include a seating surface shaped to conform to the shape of the elastic ring.

In a preferred embodiment of the elastic ring and the corresponding seating parts, the seating surface of the first part contains a groove, which holds an elastic ring with a round cross-sectional shape, or an O-ring. The cross-sectional shape of the groove may be rectangular, but it is also possible to use some other suitable cross-sectional shape. The dimensions are such that the O-ring stays in place in the groove while slightly less than one half of the O-ring projects outward from the seating surface. The seating surface of the clamping part, which is an ordinary clamping ring, contains a groove which aligns with the O-ring and which has a cross-sectional shape resembling a cut-off triangle that widens toward the O-ring, which shape continues on to narrow parts located at opposite edges of the groove, which parts form narrow claws oriented in the direction of the radius of the O-ring and which protrude perpendicularly from the level surface, the thickness of the claws being about one fourth of the thickness of the O-ring. There may be, for example, twelve pairs of claws, which function as seating parts, located at the edges of the circle formed by the groove.

Furthermore, in the preferred embodiment of the present invention, gasket rings that serve as bearings between the second part and the first part and provide directional stability to the adjustment are placed in two grooves located in the inner surface of the first part and oriented in the direction of the cross-section of the part. The corresponding locations on the surface of the second part are threadless and smooth for a distance equal to the range of adjustment. The gasket rings are preferably located near both ends of the first part. Even better directional stability is obtained with an implementation in which the first part is the body, and the body is extended past the clamping part and possibly even the means of screwing the adjusting part, while leaving them a suitable space and opening in the body, and one gasket ring is located near the end of the extension of the body and the other gasket ring is located at the other end of the body. Furthermore, it is possible that a similar gasket ring that serves as a bearing between the clamping part and the second part is located at the end of the clamping part that is farthest from the body.

In one embodiment of the present invention, the elastic ring also functions as a bearing ring between the first and second parts. In that case, the groove for the elastic ring in the seating surface of the first part and the groove for the bearing ring in the inner surface of the part are combined.

The following benefits are obtained by means of the elastic ring and the suitably shaped and sized seating parts. Longitudinal backlash is eliminated by suitably screwing the third part, or clamping part. Unlike many ordinary clamping solutions, the clamping part will remain in position without loosening or tightening and stay aligned with respect to the first part, making easy and sufficiently sensitive adjustment possible. The adjustment is easy to make because the clamping that eliminates backlash and improves directional stability does not need to be loosened or set while performing said adjustment, because the clamping is suitably set before performing said adjustment. Another benefit of this solution is that the elastic ring exerts a relatively even force on the clamping part during the clamping.

BRIEF DESCRIPTION OF THE SEVERAL VIEWS OF THE DRAWING

The present invention is described in detail below, with references to the enclosed drawings, in which the same or similar parts in different drawings are shown with the same reference numbers.

DETAILED DESCRIPTION OF THE INVENTION

Figure 1A:
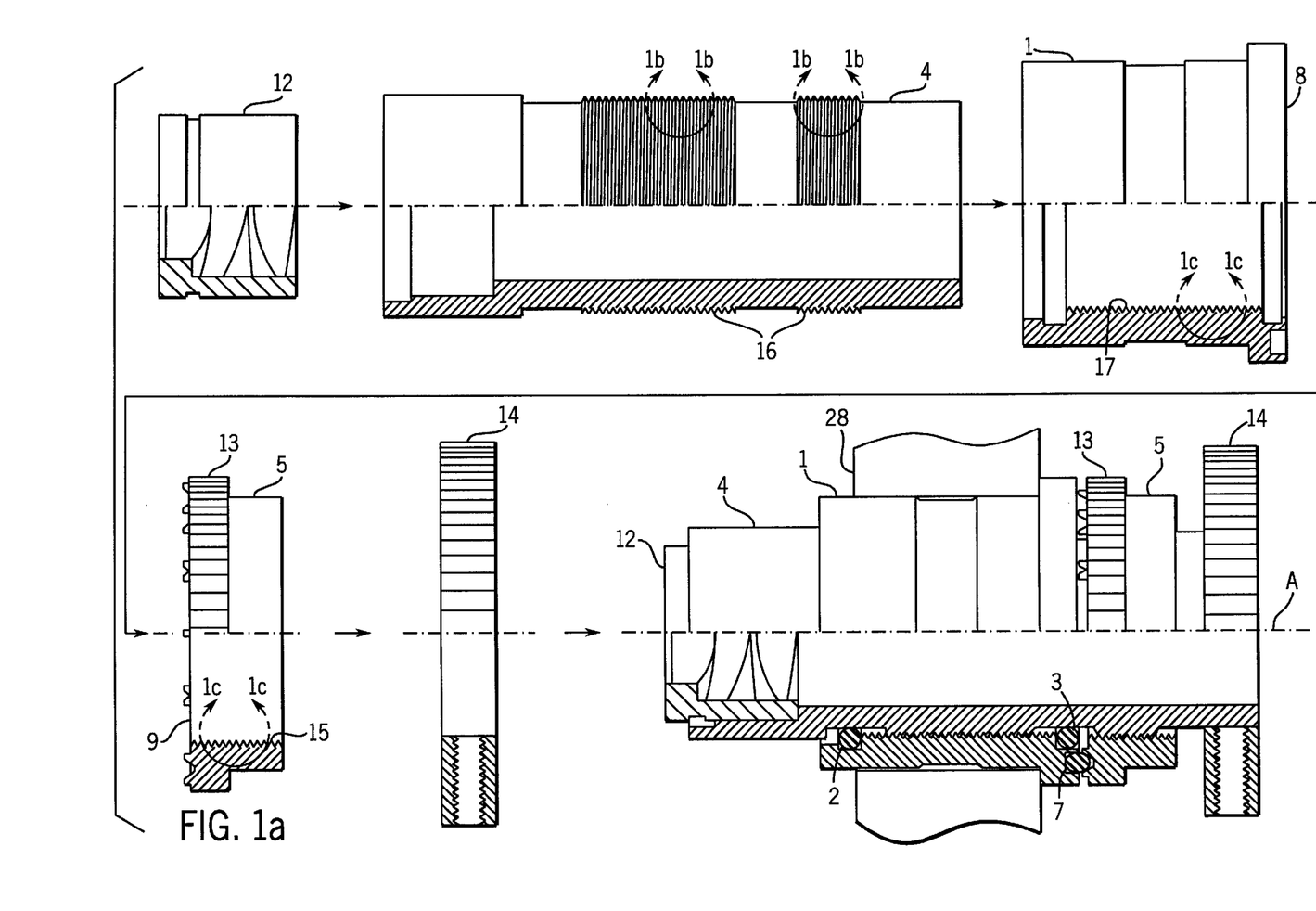
FIG. 1a shows a preferred embodiment of a first main application of a fine-mechanical adjusting device according to the present invention in which a first part is a body and a second part is an adjusting part, by means of an exploded view and an assembled view, in which figure the top half shows a side view and the bottom half shows a cross-sectional view along the center plane of the exploded parts and assembly.
Figure 1B:
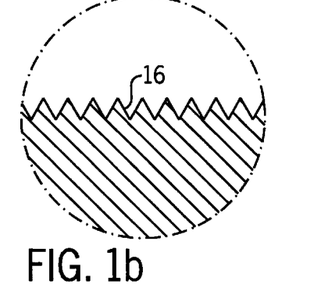
FIGS. 1b and 1c show threaded portions of the device.
Figure 1C:
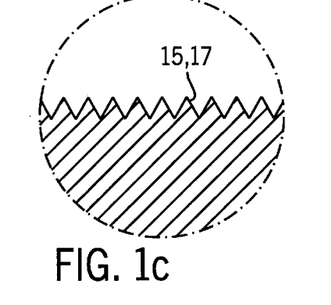

FIG. 1 shows a preferred embodiment of an adjusting device according to the present invention, which in this case is applied to the distance adjustment of a collimating lens arrangement 12 of a laser diode (not shown). The lens arrangement 12 is fastened to an adjusting part 4 having external threads 16, which screws to a body 1 having internal threads 17, and which clearly extends past the end surface 8 of the body 1 when in place. A clamping part 5 having internal threads 15, which screws to the part of the adjusting part 4 that extends past the end surface 8, contains an integral or fastened means 13 for rotating clamping parts, which may be knurled or similarly treated, in this case, knurled ring, and a seating surface 9, which faces the end surface 8 of the body, and which contains seating parts according to the present invention. A part 14, which may be a knurled or similarly treated, in this case, knurled ring, is fastened by means of threads, for example, to the end of the adjusting part 4 that is opposite the lens arrangement 12 for the purpose of rotating the adjusting part. The complete adjusting assembly is fastened by means of the body to the housing 28 of the device of said application. Reference numbers 2 and 3 indicate gasket rings that serve as bearings between the adjusting part 4 and the body 1 and reference number 7 indicates an elastic ring according to the present invention, which is described in more detail with reference to FIGS. 2, 5 and 6. Reference mark A indicates the axis of the adjusting device.

Figure 2:
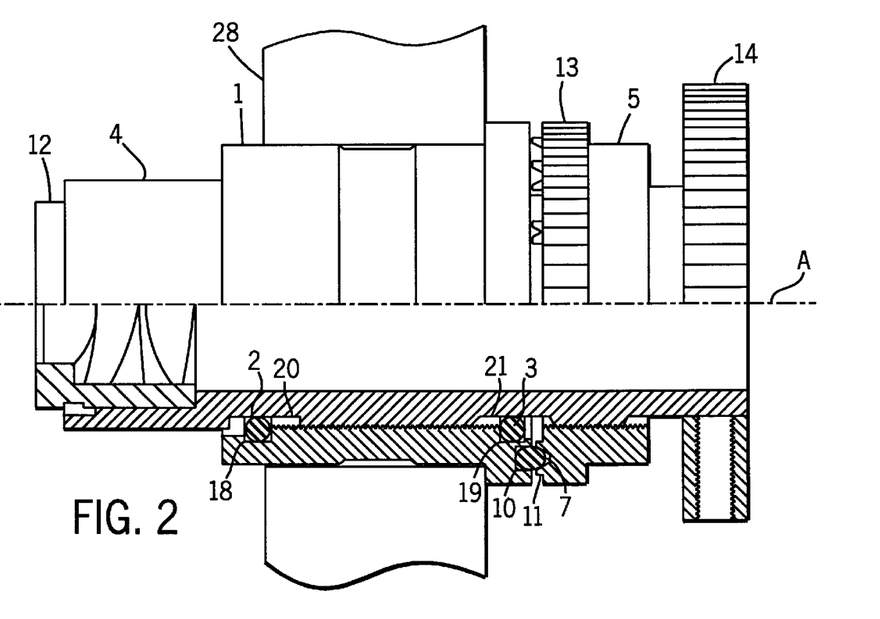
FIG. 2 shows an enlarged view of the assembled view of FIG. 1.

FIG. 2 shows an enlarged view of the assembled view of FIG. 1. Two gasket rings 2 and 3 that serve as bearings between the adjusting part 4 and the body 1 and provide directional stability to the adjustment are placed respectively in two grooves 18 and 19 located in the inner surface of the body and oriented in the direction of the cross-section of the body. The corresponding locations 20 and 21 on the surface of the adjusting part 4 are threadless and smooth for a distance equal to the range of adjustment. In the preferred embodiment, the gasket rings 2 and 3 are located near the corresponding ends of the body.

FIG. 2 also shows a circular groove 10 in the end surface 8 of the body 1, which holds an elastic O-ring 7 that is fitted to the shape and size of the groove. A seating surface 9 of a clamping part 5, which in this embodiment is for the most part a level surface oriented in the same direction as the level surface of the end surface 8, contains clawlike parts 11, which form a "fork" when paired, and which align with and squeeze against the O-ring 7 when the clamping part 5 is screwed toward the body 1.

Figures 5A, 5B:
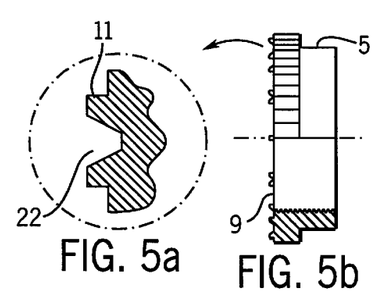
FIGS. 5a, 5b, 5c, and 5d show a clamping part according to a preferred embodiment of the present invention, and partial enlargements of said part as a cross-sectional view and a view perpendicular to a seating surface of said part.
Figure 5C:
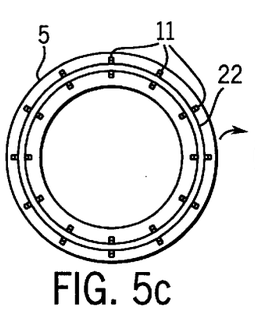
Figure 5D:
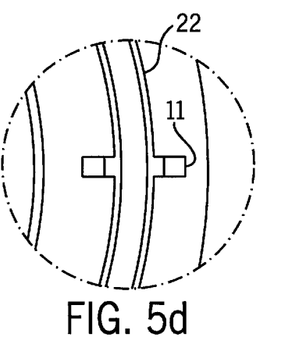

The shape of the seating surface 9 and the location and shape of the seating parts 11 are shown more clearly in FIG. 5a. The seating surface 9, which for the main part is a level surface, contains a groove 22 which aligns with the O-ring and which has a cross-sectional shape resembling a cut-off triangle that widens toward the surface, which shape continues on to the narrow parts 11 located at opposite edges of the groove, which parts form narrow claws oriented in the direction of the radius of the O-ring and which protrude perpendicularly from the level surface, the thickness of the claws being about one fourth of the thickness of the O-ring. In the presented embodiment, there are twelve pairs of claws evenly spaced along the edges of the groove.

Figure 6:
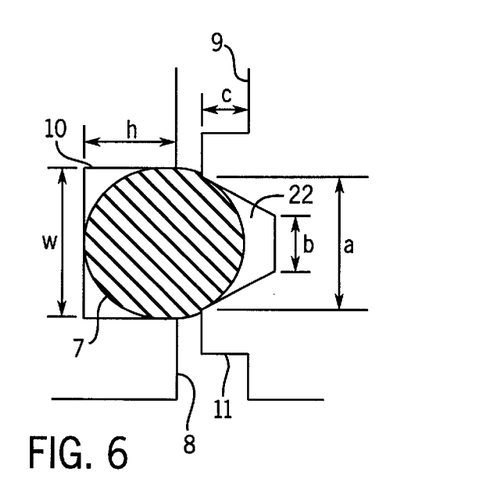
FIG. 6 shows an enlargement of a part of the cross-sectional view of FIG. 1 that depicts an O-ring and seating parts according to the preferred embodiment of the present invention.

Referring to FIG. 6, the interaction between the O-ring 7 located at the end surface 8 of the body 1 and the seating parts on the seating surface 9 of the clamping part 5 formed by the groove 22 and the parts 11, as well as the operation of the adjusting device according to the present invention are explained in more detail in conjunction with its preferred embodiment. FIG. 6 shows a cross-sectional view of the O-ring 7 and the fit of the claw-like parts 11 to the O-ring so that the claw-like parts are squeezed against the O-ring when the clamping part 5 is screwed. The cross-sectional shape of the groove 10 in the end face 8 of the body is rectangular and its width w in the preferred embodiment is slightly less than the thickness of the O-ring 7 and its height h is about half or slightly more than half of the thickness of the O-ring. These dimensions ensure that the O-ring 7 will stay in place when pressed into the groove 10 and will not turn with the clamping part 5 when the clamping part is screwed toward the end surface 8 of the body 1. Dimensions a, b and c of the seating parts 11 and the groove 22 are such, that the seating parts 11 begin to change the shape of the O-ring as the clamping part 5 is rotated, whereupon the elastic O-ring begins to exert a force on the clamping part 5 via the seating parts, and due to the elasticity of the ring, the magnitude of the force depends on the amount of change in the shape of the O-ring, or, in other words, how much the clamping part 5 is rotated. A professional in the field will comprehend that this will eliminate the longitudinal backlash between the threads of the adjusting part 4 and the threads of the clamping part 5 and the body 1. The claw-like shape of the seating parts 11 allows them to cling well to the O-ring 7 with relatively little clamping, thus keeping the clamping part 5 in place with respect to the body 1, even though the adjusting part 4 is being rotated. The height c of the seating parts 11 is selected to ensure that the seating parts rest against the O-ring and will not come in contact with the end surface 8. The widening shape of the groove 22 in the seating surface 9 and the seating parts 11 together with the round cross-sectional shape of the O-ring 7 understandably have an advantageous effect on the directional stability of the adjustment. The adjusting device according to the present invention also provides easy adjustment, because the clamping does not have to be opened or changed during the adjustment procedure. The elasticity of the elastic ring 7 makes it possible to suitably adjust the thrusting force directed to the body 1 and the clamping part 5, and thereby adjust the sensitivity of the adjustment.

In the above description of a preferred embodiment of the present invention, an elastic O-ring is used that is made of nitrile rubber NBR 70 with a Shore hardness of 70. A professional in the field will understand that a vast selection of other suitable materials is available from which the elastic ring 7 can be manufactured, whose flexibility and elasticity and other characteristics can be chosen according to the realization of the seating parts.

Figure 3:
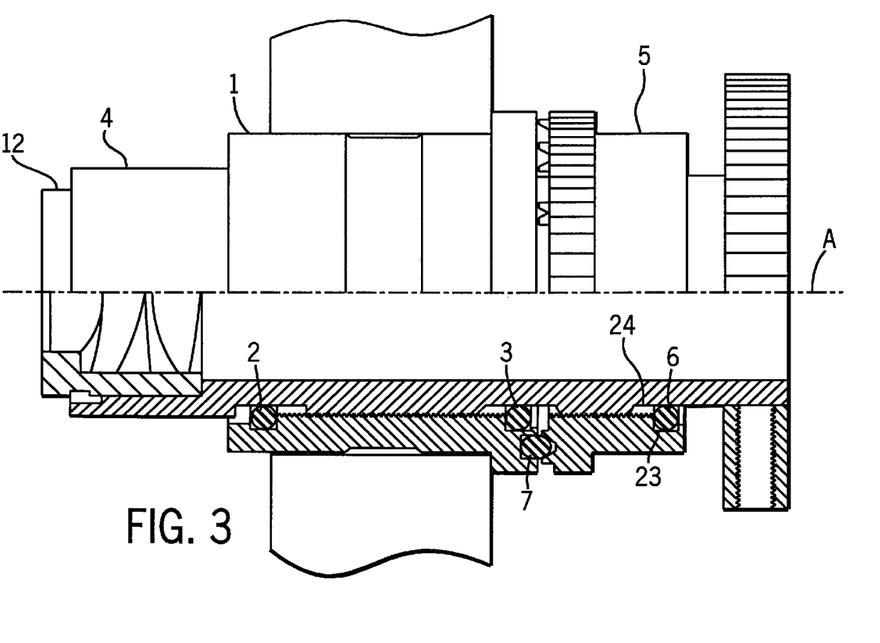
FIG. 3 shows a drawing similar to FIG. 2 of another embodiment of the present invention.

FIG. 3 shows an embodiment of the present invention that is similar to the embodiment of FIGS. 1 and 2, except that a gasket ring 6 that serves as a bearing between the clamping part 5 and the adjusting part 4 is located at the end of the clamping part 5 that is farthest from the body 1, in similar fashion to the rings 2 and 3 at the ends of the body 1. The inner surface of the clamping part 5 contains a groove 23, which holds the gasket ring 6, and the corresponding location on the adjusting part 4 has a smooth surface 24, which is as long as the range of adjustment. This solution will improve directional stability to some degree, but, on the other hand, friction encountered when rotating the adjusting part will increase.

Figure 4A:
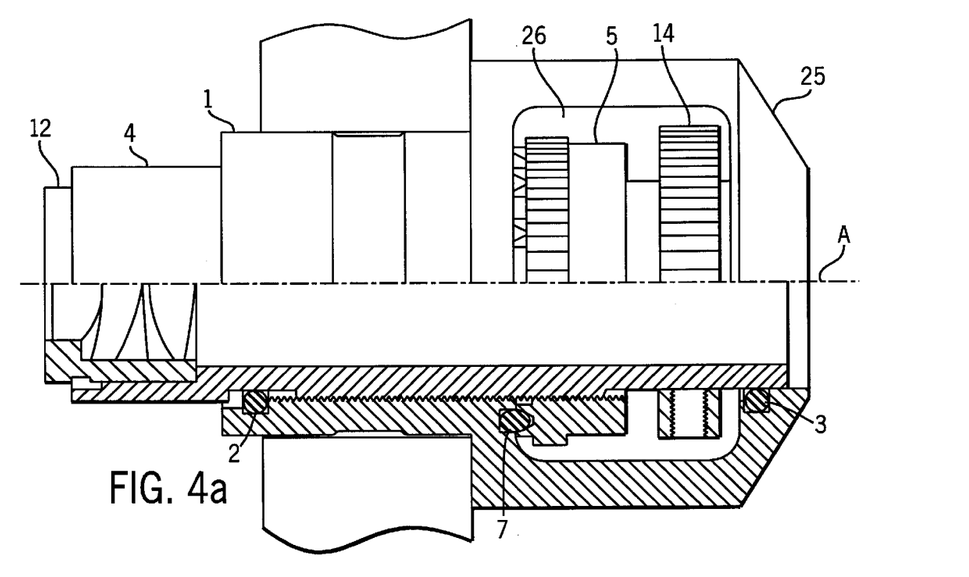
FIGS. 4a, 4b, and 4c show yet another embodiment of the present invention, with FIG. 4 (a) showing a side view similar to the assembled view of FIG. 1, FIG. 4 (b) showing showing an end view and FIG. 4(c) showing a top view.
Figure 4B:
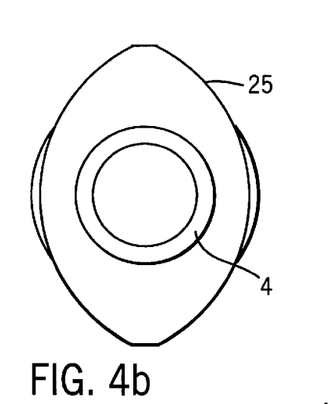
Figure 4C:
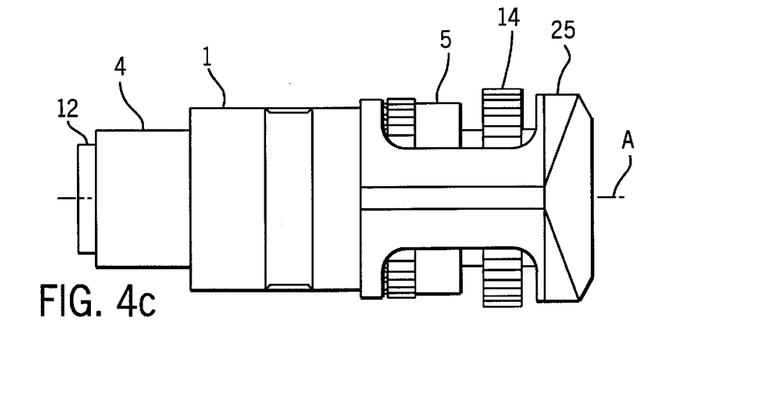

FIG. 4a, 4b, and 4c show an embodiment whose functioning and parts correspond to those of FIGS. 1 and 2, except that an extension 25 has been added to the body 1 so that it reaches beyond the clamping part 5 and the ring 14 of the adjusting part 4, leaving them space and an opening 26, and surrounding the adjusting part 4 at its extended, unthreaded end, and into which extension the second gasket ring 3 which serves as a bearing between the body 1 and the adjusting part 4, is now located. Because the parts and functions related to the gasket rings are otherwise similar to what is described above, the figure only shows reference numbers for the gasket rings 2 and 3.

Figure 7:
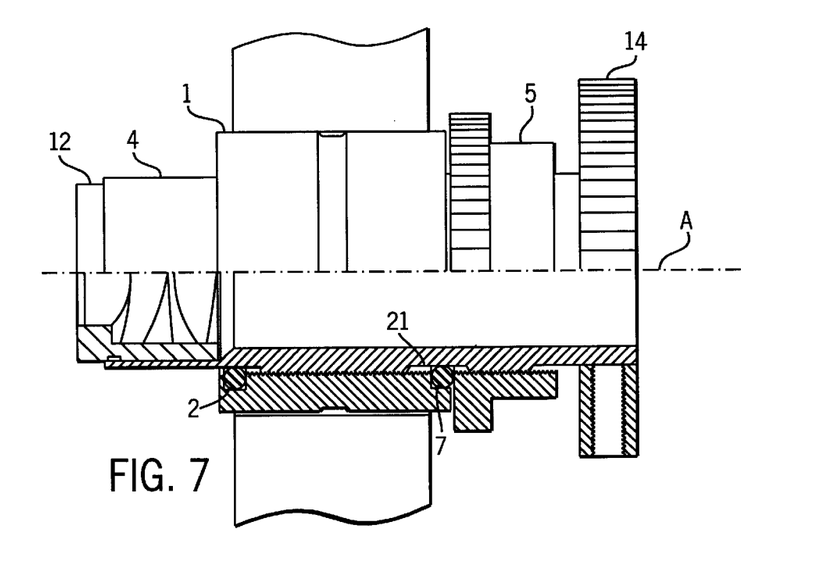
FIG. 7 shows an alternate embodiment of the embodiment shown in FIG. 1.

FIG. 7 shows an alternative embodiment of the embodiment shown in FIG. 1, in which the elastic O-ring 7 also functions as a gasket ring that serves as a bearing between the adjusting part 4 and the body 1. This embodiment functions satisfactorily, but is a compromise which does not give the best possible operation, because, for example, screwing the clamping part toward the body 1 simultaneously squeezes the ring 7 against the bearing surface 21 of the adjusting part 4, thus increasing friction.

Figure 8:
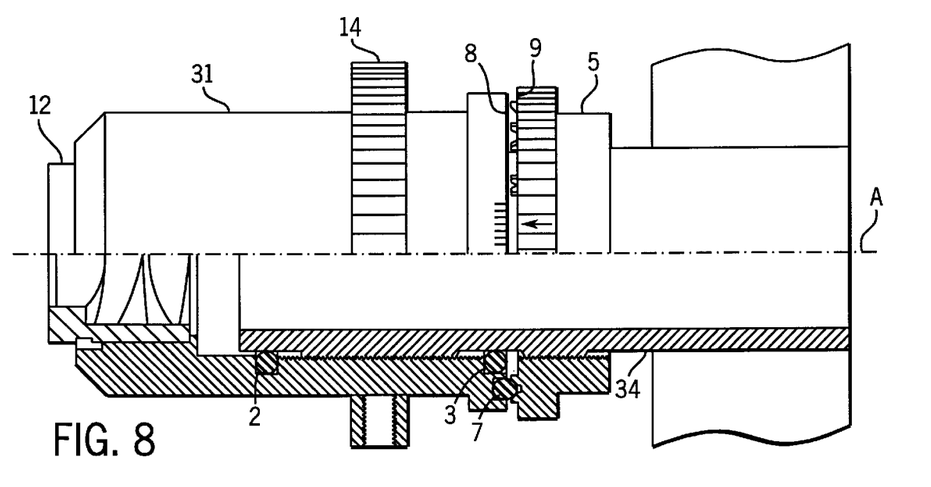
FIG. 8 shows an embodiment of a second main application of a fine-mechanical adjusting device according to the present invention, in which a second part is a body and a first part is an adjusting part.

FIG. 8 shows an embodiment of a second main application of a fine-mechanical adjusting device according to the present invention. A second part 34 having external threads is a body that screws on a first part 31, which is an adjusting part, whose end surface 8 is a first seating surface toward which a clamping part 5 is screwed. A preferred realization of the seating surface 9 of the clamping part and the seating parts is the same as in the embodiment shown in FIG. 1. The adjusting ring 14 is advantageously located between the gasket rings 2 and 3, which serve as bearings between the adjusting part 31 and the body 34, as shown in the figure, which naturally is a good solution from the point of view of stable adjustment. Many of the alternative solutions presented above in conjunction with the main application of FIG. 1 can also be applied to this application, and a professional in the field will comprehend that also many other types of applications can be developed from this second main application.

The adjustable clamping part 5 and the body 1 in the first main application or the adjusting part 31 in the second main application that come against it can be correspondingly marked as shown in FIG. 8, to indicate the position or range of positions in which clamping is suitable, or aid in estimating the magnitude of the thrusting force of the elastic ring on the parts that come against it.

In some cases, the rings 2 and 3, the grooves 18 and 19 that hold them and the smooth seating surfaces 20 and 21 corresponding to the adjustment range can be left out. This is possible, for example, when it is not necessary to improve directional stability in the device or a long adjustment range is desired. A long adjustment range may come into question, for example, when the adjustment is performed with a step motor.

If the adjusting movements and changes in direction in the application are rapid and it is possible that clamping by means of an elastic ring may loosen, this possibility can be eliminated completely by equipping the clamping with a lock, which can be realized by means of numerous methods known by professionals in the field.

In the above embodiments the adjusting device according to the present invention is used to adjust the distance in a lens arrangement. It is clear that the object being adjusted can just as easily be something else, such as an optical, optoelectronic or mechanical component. In some applications it may be desirable that the component being adjusted doesn't rotate while the adjustment is being performed, as it does in the described embodiments, in which it is fastened to the adjusting part. The component being adjusted can be prevented from rotating, for example, by fastening it to a separate fastening part that is mounted to the body by means of bearings, which will allow it to move in the direction of the axis of the adjusting device, and simultaneously preventing the fastening part from rotating by means of a guide pin or pins or some other suitable means. The adjustment can be conveyed to the fastening part with a suitable arrangement that may include an arrangement that squeezes the fastening part against the adjusting part by means of a spring to eliminate backlash. One possibility is to mount the fastening part inside the adjusting part by means of bearings and simultaneously prevent the fastening part from rotating by suitable means. The mounting by means of bearings can be realized so that there is no backlash between the fastening part and the adjusting part in the direction of the axis of the adjusting device. This type of solution can also be realized without spring-loading to eliminate backlash. Backlash between the fastening part and the body and/or the adjusting part can be eliminated by means of many solutions that implement means, such as guides, springs and bearings, which will not be examined more closely herein.

The different applications of the adjusting device according to the present invention, which include many kinds of adjustments and measurements, naturally can be equipped with a graduated scale that is suitable for the given application.

An adjusting device according to the present invention is described above in conjunction with certain embodiments and an application. Naturally, the present invention is not limited to these, and a professional in the field can envision a number of alternatives regarding the shape, fastening and location of the elastic ring, and especially in the realization of the seating parts, which are in accordance with the intent and idea of the present invention. The present invention is defined in the claims, and its embodiments may vary within the framework of said claims.

I claim:

1. A fine-mechanical adjusting device for adjusting a first element (12) with respect to a second element (28), said device having an axis (A) and comprising:
    a first part (1, 31) coupled to one of said first and second elements, said first Part having internal threads,
    a second part (4, 34) coupled to the other of said first and second elements, said second part having external threads which threadably engage with the internal threads of said first part to carry out said fine adjustment by relative rotation of said first and second parts, said second part having a portion projecting from said first part (1, 31) along the axis (A) when said first and second parts are screwed together,
    a third part (5) having internal threads which engage external threads on the portion of said second part (4, 34) that projects from said first part (1, 31);
    a first seating surface (8) of said first part (1, 31) which faces a second seating surface (9) of said third part (5),
    an elastic ring (7) fastened to one of said first seating surface (8) or said second seating surface (9), the general shape of said ring being a circle located around the axis (A) of said adjusting device, on a plane perpendicular to said axis, with the center point of said circle being on said axis (A), and
    seating parts contained on the other of the second seating surface (9) or first seating surface (8), the size and shape of said seating parts (11, 22) being such as to fit together with a part of said elastic ring (7) that projects beyond said one seating surface (8, 9), so that when said third part (5) is relatively rotated with respect to said first part (1) to bring it closer to said first part (1, 31), said seating parts (11, 22) align with said elastic ring (7), squeeze against it and change its shape so that said elastic ring (7) keeps said third part (5) in place and aligned with said first part (1, 31), and said ring (7) exerts a force on said first and third parts in the direction of said axis (A) of said adjusting device which is sufficiently large to remove backlash from the threads of said parts yet small enough to allow said relative rotation between said first and second parts.

2. The fine-mechanical adjusting device according to claim 1, characterized in that said one of said first or second seating surfaces (8, 9) contains a circular groove (10) for receiving said elastic ring, said circular groove and elastic ring being respectively sized and shaped for retaining said ring in said groove when said first and third Parts are relatively rotated.

3. The fine-mechanical adjusting device according to claim 2, characterized in that said elastic ring (7) is an O-ring.

4. The fine-mechanical adjusting device according to claim 1, characterized in that said seating parts include a part of said other seating surface (9, 8) which, by means of its complementary shape, fits to and aligns with a part of said elastic ring (7) that projects beyond said one seating surface (8, 9).

5. The fine-mechanical adjusting device according to claim 1, characterized in that said seating parts include protrusions and/or depressions on said other of said seating surfaces (8, 9).

6. The fine-mechanical adjusting device according to claim 5, characterized in that said seating parts are formed in conjunction with a groove (22) in said other of said sealing surfaces which is aligned with and opens toward said elastic ring (7), said seating parts being circumferentially spaced along said groove, and located on opposite edges of said groove, said sealing parts being circumferentially narrow and protruding from said other of said seating surfaces (9, 8).

7. The fine-mechanical adjusting device according to claim 6, characterized in that said groove (22) has a cross-sectional shape resembling a cut-off triangle whose sides continue toward said seating parts (11), which protrude perpendicularly from said seating surface (9, 8) to form said seating parts as claw-like Darts.

8. The fine-mechanical adjusting device according to claim 1, characterized in that said elastic ring (7) is fastened to said first seating surface (8) of said first part (1, 31) and said seating parts (11, 22) are formed on said second surface (9) of said third part (5).

9. The fine-mechanical adjusting device according to claim 1, characterized in that gasket rings (2, 3) are interposed between said first and second parts to serve as bearings between said first part (1, 31) and said second part (4, 34).

10. The fine-mechanical adjusting device according to claim 1, characterized in that at least one gasket ring (6) is interposed between said third Dart and said second part to serve as a bearing between said third part (5) and said second part (4, 34).

11. The fine-mechanical adjusting device according to claim 1, characterized in that said elastic ring (7) functions as a gasket ring that serves as a bearing between said first and second parts.

12. The fine-mechanical adjusting device according to claim 1, characterized in that said first part (1) is a body, said second part 94) is an adjusting part that screws on said body by relative rotation between said first and second parts and said third part (5) is a clamping part, and a portion of said adjusting part (4) extends beyond said body (1) and said clamping part (5) along the axis (A) and contains an element (14) that facilitates rotation of said adjusting part (4) with respect to said body.

13. The fine-mechanical adjusting device according to claim 12, characterized in that said body (1) has an extension (25), which extends beyond said third part (5) and said element (14) of said adjusting part (4), said extension surrounding but being spaced from, said third part and element and having an opening (26) exposing said third part and element, and in which extension a gasket ring (3) which serves as a bearing between said body (1) and said adjusting part (4) is located, another gasket ring (2) serving as bearing between said first and second parts (4, 1) being located at the opposite end of said body from said extension.

14. The fine-mechanical adjusting device according to claim 9, characterized in that said second part (34) is a body, said first part (31) is an adjusting part that screws to said body and said third part (5) is a clamping part, and said adjusting part (31) contains an element (14), which facilitates rotation of said adjusting part with respect to said body, and which is located so that said gasket rings (2, 3) that serve as bearings between said adjusting part (31) and said body (34) are located along the axis (A) on both sides of said element (14).

15. The fine-mechanical adjusting device according to claim 1, characterized in that contiguous portions of said third part (5) and said first part (1, 31) are marked in a manner to indicate the relative position of said first and third parts, thereby to allow the thrusting force exerted by said elastic ring (7) on said first 91, 31) and third (5) parts to be estimated.

* * * * *